US010551528B2

(12) United States Patent
Wiensch et al.

(10) Patent No.: US 10,551,528 B2
(45) Date of Patent: Feb. 4, 2020

(54) LOW REFLECTION ARTICLES AND RELATED SYSTEMS AND METHODS

(71) Applicant: Pacific Light & Hologram, Inc., South Pasadena, CA (US)

(72) Inventors: Joshua D. Wiensch, Pasadena, CA (US); Tina Qin, Van Nuys, CA (US); Jonathan Seamus Blackley, South Pasadena, CA (US)

(73) Assignee: Pacific Light & Hologram, Inc., South Pasadena, CA (US)

( * ) Notice: Subject to any disclaimer, the term of this patent is extended or adjusted under 35 U.S.C. 154(b) by 4 days.

(21) Appl. No.: 16/025,129

(22) Filed: Jul. 2, 2018

(65) Prior Publication Data

US 2019/0033490 A1    Jan. 31, 2019

Related U.S. Application Data

(60) Provisional application No. 62/537,147, filed on Jul. 26, 2017.

(51) Int. Cl.
| | | |
|---|---|---|
| *G02B 1/113* | (2015.01) | |
| *C23C 22/56* | (2006.01) | |
| *G02B 1/11* | (2015.01) | |
| *C23C 22/84* | (2006.01) | |
| *C25D 11/16* | (2006.01) | |
| *C25D 11/24* | (2006.01) | |
| *G02B 5/00* | (2006.01) | |

(52) U.S. Cl.
CPC ............. *G02B 1/113* (2013.01); *C23C 22/56* (2013.01); *C23C 22/84* (2013.01); *C25D 11/16* (2013.01); *C25D 11/243* (2013.01); *G02B 1/11* (2013.01); *G02B 5/003* (2013.01)

(58) Field of Classification Search
CPC ................................ C23C 22/56; C25D 11/16
USPC ....................................................... 428/195.1
See application file for complete search history.

(56) References Cited

U.S. PATENT DOCUMENTS

| | | | |
|---|---|---|---|
| 4,111,762 A | 9/1978 | Wade et al. | |
| 4,589,972 A | 5/1986 | Pompea et al. | |
| 2011/0284383 A1 | 11/2011 | Cabot et al. | |
| 2019/0033490 A1* | 1/2019 | Wiensch | ................. C23C 22/56 |

FOREIGN PATENT DOCUMENTS

| | | | | |
|---|---|---|---|---|
| EP | 1055709 | | 11/2000 | |
| EP | 1159935 A1 * | 12/2001 | ......... | A61F 2/30767 |

OTHER PUBLICATIONS

Goueffon et al., "Black anodic coatings for space applications: Study of the process parameters, characteristics and mechanical properties", Journal of Materials Processing Technology 209, pp. 5145-5151, 2009.
Goueffon et al., "Chemical characteristics, mechanical and thermo-optical properties of black anodic films prepared on 7175 aluminium alloy for space applications", Materials Chemistry and Physics 120, pp. 636-642, 2010.

(Continued)

*Primary Examiner* — Betelhem Shewareged
(74) *Attorney, Agent, or Firm* — Fish & Richardson P.C.

(57) ABSTRACT

Low reflection articles, and related systems and methods are disclosed. The articles have a surface with primary pores and secondary pores. At least some of the secondary pores contain agent, such, for example, a light absorbing dye.

29 Claims, 4 Drawing Sheets

(56) References Cited

OTHER PUBLICATIONS

Invitation to Pay Additional Fees in International Application No. PCT/US2018/040597, dated Oct. 29, 2018, 12 pages.
Lee et al., "Nanoporous anodic alumina oxide layer and its sealing for the enhancement of radiative heat dissipation of aluminum alloy", Nano Energy 31, pp. 504-513, 2016.
Clariant [online], "Aluminum Finishing Specific Color Solutions," 2012, retrieved on Jan. 9, 2019, URL <https://docplayer.net/47197720-Aluminum-finishing-specific-color-solutions.html>, 9 pages.
Heber and Produkte [online], "Weather Fast Adsorptive Dyeing of Anodized Aluminum for Outdoor Applications," Proceeding of the Anodizing Conference, retrieved on Jan. 9, 2019, URL <https://c.ymcdn.com/sites/www.anodizing.org/resource/dollection/136C16AB-DEDC-485F-9A81-AF CBD97A24A8/Weather_Fast_Adsorptive_Dyeing_paper_2015_Heber_Thomas.pdf>, Sep. 2015, 1-15.
PCT International Search Report and Written Opinion in International Appln. No. PCT/US2018/040597, dated Jan. 30, 2019, 25 pages.

* cited by examiner

LOW REFLECTION ARTICLES AND RELATED SYSTEMS AND METHODS

CROSS-REFERENCE TO RELATED APPLICATION

The application claims priority under 35 U.S.C. § 119 to U.S. Ser. No. 62/537,147, filed Jul. 26, 2017, and entitled "Low Visible-Light Reflection Anodized Aluminum Surfaces," the entire contents of which is incorporated by reference herein.

FIELD

The disclosure relates to low reflection articles, and related systems and methods.

BACKGROUND

Low reflectance surfaces are desirable for a variety of applications.

SUMMARY

The disclosure provides high quality articles that exhibit relatively low reflectivity, particularly in the visible wavelength range. The articles can be made of materials, such as, for example, aluminum, which typically exhibit relatively high reflectivity in the visible wavelength range. The articles can be advantageously used in various settings, such as, for example, optical systems, including holographic systems, cameras, telescopes, color selective filters, housings for photonic sensors, solar collectors, thermal solar systems, information display systems and systems for storing light sensitive materials. The relatively low reflectivity of the articles can be particularly beneficial in that they can dramatically reduce what would otherwise be a relatively large background of undesirable reflected visible light, thereby enhancing the accuracy, reliability, and utility of optical systems.

The disclosure also provides relatively efficient and cost-effective methods for providing such articles, as well as systems containing such articles.

The use of articles formed of aluminum, aluminum alloys and/or other metals is ubiquitous in the optical industry, as well as many other industries, because the materials are relatively inexpensive, available and easy to machine to desired shapes and sizes. Hence, the technology disclosed herein has high commercial applicability.

In a general aspect, the disclosure provides an article that includes a substrate including a metal. A surface of the substrate includes primary pores and secondary pores. An average diameter of the primary pores is at least four times greater than an average diameter of the secondary pores.

In another general aspect, the disclosure provides an article that includes a substrate including a metal. A surface of the substrate includes primary pores and secondary pores. An average diameter of the primary pores is from 500 nm to 15 μm. An average diameter of the secondary pores 50 nm to about 250 nm.

In some embodiments, the average diameter of the primary pores is at least four (e.g., at least five, at least 10, at least 25, at least 50, at least 75) times greater than the average diameter of the secondary pores.

In some embodiments, the average diameter of the primary pores is at most 100 times greater than the average diameter of the secondary pores.

In some embodiments, the average diameter of the primary pores is at least 500 nm (e.g., at least 750 nm, at least 900 nm, at least 1 μm).

In some embodiments, the average diameter of the primary pores is at most 15 μm (e.g., at most 10 μm, at most 5 μm).

In some embodiments, the article has a region which includes the primary pores, and the region of the article has a porosity ratio of at least 0.1 (e.g., at least 0.15, at least 0.2, at least 0.25) and/or at most 0.3 (e.g., at most 0.25, at most 0.2).

In some embodiments, the average diameter of the secondary pores is at most 250 nm (e.g., at most 200 nm, at most 150 nm).

In some embodiments, the average diameter of the secondary pores is at least 50 nm (e.g., at least 75 nm, at least 90 nm, at least 100 nm).

In some embodiments, the secondary pores have an average aspect ratio of at least 10 (e.g., at least 15, at least 20, at least 25), and/or at most 40 (e.g., at most 35).

In some embodiments, the article further includes a light absorbing agent. The light absorbing agent can be, for example, in the secondary pores. The light absorbing agent can be a visible light absorbing agent. The light absorbing agent can be a dye (e.g., a water-soluble dye, a black diazo dye). In some embodiments, a dye is a member selected from the group consisting of: tetrasodium 6-amino-4-hydroxy-3-[[7-sulfonato-4-[(4-sulfonatophenyl)azo]-1-naphthyl]azo]naphthalene-2,7-disulfonate; tetrasodium (6Z)-4-acetamido-5-oxo-6-[[7-sulfonato-4-(4-sulfonatophenyl)azo-1-naphthyl]hydrazono]naphthalene-1,7-disulfonate; nigrosine; Caswell Black HBL dye; Sudan Black B, Nigrosin; Acid Violet 5; Acid Violet 7; Acid Violet 9; Acid Violet 17; Acid Violet 19; and process black. In some embodiments, a light absorbing agent is selected from the group consisting of metal-free azo dyes, sulphonated coumarin dyes, metallized azo dyes, azo/anthraquinone dyes, metal free dyes, triphenylmethane dyes, and functionalized anthraquinone dyes. In some embodiments, the light absorbing agent is carbon black (e.g., hydrophilic carbon black, carbon black nanoparticles). Carbon black particles can have an average diameter of at most 50 nm. In some embodiments, the light absorbing agent includes carbon nanotubes (e.g., hydrophilic carbon nanotubes).

In some embodiments, the surface of the article has a fractional reflectance of at most 0.0002 (e.g., at most 0.00015, at most 0.00013, at most 0.0001) at a wavelength of from 400 nm to 700 nm.

In some embodiments, the surface of the article has a fractional reflectance of from 0.0001 to 0.0002 at a wavelength of from 400 nm to 700 nm.

In some embodiments, the fractional reflectance is measured at a wavelength of at least 450 nm (e.g., at least 500 nm, at least 520 nm) and/or at most 650 nm (e.g., at most 600 nm, at most 550 nm). For example, the fractional reflectance can measured at a wavelength of 532 nm.

In some embodiments: the surface of the article has a first fractional reflectance at a first wavelength of from 400 nm to 700 nm; the surface of the article has a second fractional reflectance at a second wavelength of from 400 nm to 700 nm; the first wavelength is different from the second wavelength; and the first fractional reflectance is different from the second fractional reflectance. The first wavelength can be at least 25 nm (e.g., at least 50 nm, at least 75 nm) greater than the second wavelength. The first wavelength is at least 635 nm, and the second wavelength can be at most 560 nm. The first wavelength can be at least 635 nm, and the second wavelength can be at most 490 nm. The first wavelength can be at least 520 nm, and the second wavelength can be at most 490 nm.

In some embodiments, the surface of the article has a fractional reflectance of at most 0.0002 at a wavelength of from 10 nm to 400 nm.

In some embodiments, the fractional reflectance is measured at an angle of incidence of 6°.

In some embodiments, the fractional reflectance is measured at an angle of reflection of 6°.

In some embodiments, the fractional reflectance is measured at an angle of incidence and an angle of reflectance which is equal to the angle of incidence.

In some embodiments, the metal includes a member selected from the group consisting of aluminum, titanium, niobium, tantalum, magnesium and zinc. The metal can be, for example, aluminum.

In some embodiments, the substrate includes an alloy which includes the metal. The alloy can be, for example, selected from the group consisting of 1000 series aluminum alloy, 2000 series aluminum alloy, 3000 series aluminum alloy, 4000 series aluminum alloy, 5000 series aluminum alloy, 6000 series aluminum alloy, and 7000 series aluminum alloy.

In some embodiments, a portion of the substrate includes an oxide, and the oxide includes the metal.

In some embodiments, the secondary pores are present in the portion of the oxide.

In some embodiments, the surface of the article includes a fluoro-aluminate.

In some embodiments, the surface of the article includes a hydrated aluminum oxide.

In a general aspect, the disclosure provides a system that includes an article as described herein. The system can be an optical system. The system can be selected from the group consisting of a holographic projection apparatus, a camera, a telescope, a color selective filter, a housing for a photonic sensor, a solar collector, a thermal solar system, an information display system, and a system for storing light sensitive materials.

In a general aspect, the disclosure provides a method of forming an article disclosed herein. The method can include wet etching, anodizing and/or sealing.

In a general aspect, the disclosure provides a method that includes chemically etching an article which includes a metal to form primary pores in the article. The method also includes anodizing the article including the primary pores to form secondary pores, thereby providing an article having a surface which includes the primary pores and the secondary pores. At least one of the following holds: i) an average diameter of the primary pores is at least 10 times greater than an average diameter of the secondary pores; and ii) an average diameter of the primary pores is from 500 nm to 15 µm, and an average diameter of the secondary pores 50 nm to about 150 nm.

In some embodiments, the method further includes disposing a light absorbing agent into at least some of the secondary pores. The light absorbing agent can be disposed in secondary pores at a temperature of at least 10° C. and/or at most 90° C.

In some embodiments, the method further includes exposing the substrate including primary pores and secondary pores to a sealing process.

In some embodiments, the sealing process can occur after disposing the light absorbing agent into at least some of the secondary pores.

In some embodiments, the sealing process includes hot water sealing. The sealing process can include disposing at least a portion of the article including the primary and secondary pores in water having a temperature of at least 80° C. The sealing process cam include using steam. The sealing process can include using aqueous nickel acetate.

In some embodiments, the sealing process includes mid-temperature sealing. The sealing process can include disposing at least a portion of the article including the primary and secondary pores in water having a temperature of at most 80° C. The water can include at least one member selected from the group consisting of metal salts and organic additives.

In some embodiments, the sealing process includes cold sealing. The sealing process can include at least a portion of the article including the primary and secondary pores in water having a temperature of at most 30° C.

In some embodiments, chemical etching includes using a corrosive solution.

In some embodiments, the corrosive solution includes an acidic solution. The acid solution can include a member selected from the group consisting of sulfuric acid, hydrochloric acid, phosphoric acid, chromic acid, nitric acid, perchloric acid, hydrobromic acid, hydroiodic acid, boric acid, hydrofluoric acid, trifluoroacetic acid, p-toluenesulfonic acid, aminomethylphosphonic acid, and trifluoromethansulfonic acid. The acidic solution can include at least one weight percent acid and/or at most 75 weight percent acid.

In some embodiments, the corrosive solution includes an alkaline solution. The alkaline solution can include inorganic hydroxide. The inorganic oxide can include a member selected from the group consisting of sodium hydroxide, ammonium hydroxide, potassium hydroxide, cesium hydroxide, lithium hydroxide, and rubidium hydroxide. The alkaline solution can include at least five weight percent hydroxide and/or the at most 30 weight percent hydroxide. The alkaline solution can have a pH of at least 12.

In some embodiments, the corrosive solution includes an oxidizing halide salt. The corrosive solution can include at least five weight percent oxidizing halide salt and/or at most 40 weight percent oxidizing halide salt.

In some embodiments, chemical etching is performed at a temperature of at least 25° C.

In some embodiments, anodizing is performed at a temperature of at least 10° C. (e.g., at least 20° C., at least 30° C., at least 35° C.) and/or at most 50° C. (e.g., at most 40° C.).

In some embodiments, anodizing is performed using a solution including inorganic acid. The solution can include at least one weight percent (e.g., at least five weight percent inorganic acid) inorganic acid and/or at most 90 weight percent (e.g., at most 85 weight percent) inorganic acid.

In some embodiments, the inorganic acid includes a member selected from the group consisting of sulfuric acid, hydrochloric acid, phosphoric acid, chromic acid, nitric acid, perchloric acid, hydrobromic acid, hydroiodic acid, boric acid, and hydrofluoric acid.

In some embodiments, anodizing includes applying a voltage of at least five volts (e.g., at least 30 volts) to the article.

BRIEF DESCRIPTION OF THE FIGURES

The drawing illustrates generally, by way of example, but not by way of limitation, embodiments discussed in the present document.

DESCRIPTION

Figure 1:
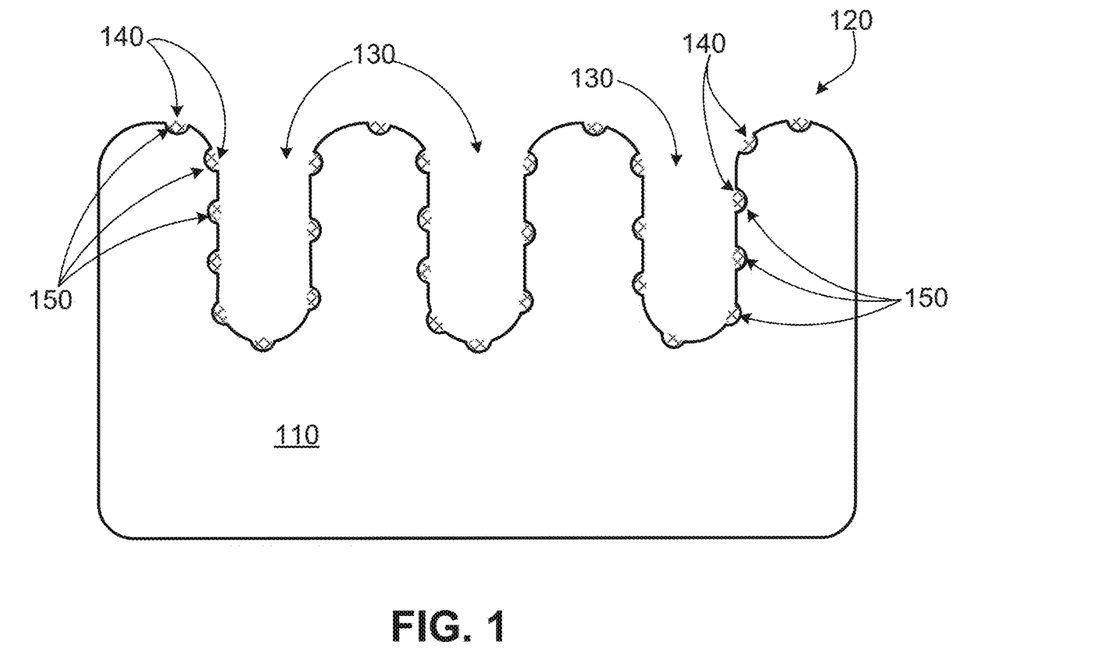
FIG. 1 is a cross-sectional view depicting an embodiment of an article.

FIG. 1 depicts an article 100 according to the disclosure. Article 100 can be a component of a system, such as an optical system, for example, a holographic projection apparatus, a camera, a telescope, a color selective filter, a housing for a photonic sensor, a solar collector, a thermal solar system, an information display system, and a system for storing light sensitive materials. For example, the article 100 may be a portion of the housing of such a system. Optionally, the article 100 may be a portion of an internal component of such a system. For example, the article 100 may be a portion of a light pipe.

The article 100 has a substrate 110 with a surface 120 that can exhibit relatively low fractional reflectance (the fraction of light impinging on the surface 120 that is reflected from surface 120). In some embodiments, the surface 120 has a fractional reflectance of at most 0.0002 (e.g., at most 0.00015, at most 0.00013, at most 0.0001).

In general, the fractional reflectance is measured at one or more wavelengths of interest. In some embodiments, the fractional reflectance is determined at a wavelength of from 400 nm to 700 nm (visible light). For example, in certain embodiments, the fractional reflectance is measured at a wavelength of at least 450 nm (e.g., at least 500 nm, at least 520 nm) and/or at most 650 nm (e.g., at most 600 nm, at most 550 nm). In some embodiments, the fractional reflectance is measured at 532 nm. In certain embodiments, the fractional reflectance is determined at a wavelength range of from 10 nm to 400 nm (ultraviolet light).

In general, the fractional reflectance may be determined using any desired angle of incidence and any desired angle of reflection. In some embodiments, the angle of incidence is the same as the angle of reflection (specular reflection) when determining the fractional reflectance. In certain embodiments, the angle of reflection is different from the angle of incidence when determining the fractional reflectance. In some embodiments, the fractional reflectance is determined using angle of incidence of 6°, and/or the fractional reflectance is determined using angle of reflection of 6°.

In some embodiments, the fractional reflectance of the surface 120 is a function of the wavelength of light. For example, the fractional reflectance of the surface 120 at a first wavelength of from 400 nm to 700 nm may be different from the fractional reflectance of the surface 120 at a different (second) wavelength of from 400 nm to 700 nm. In certain embodiments, the first wavelength is at least 25 nm (e.g., at least 50 nm, at least 75 nm) greater than the second wavelength. In some embodiments, the first wavelength is at least 635 nm, and the second wavelength is at most 560 nm. In certain embodiments, the first wavelength is at least 635 nm, and the second wavelength is at most 490 nm. In some embodiments, the first wavelength is at least 520 nm, and the second wavelength is at most 490 nm.

As shown in FIG. 1, the article includes primary pores 130, secondary pores 140, and a light absorbing agent 150 disposed in at least some of the secondary pores 140. This arrangement of primary and secondary pores may be referred to herein as the "pore-in-pore" structure. Without wishing to be bound by theory, it is believed that it is the unique nature of this arrangement of pores and light absorbing material that yield the beneficial fractional reflectance properties discussed above.

Having set forth some basic characteristics of the article 100, certain details of the article 100 are now provided.

In general, substrate 110 may be formed of any appropriate material. Typically, substrate 110 is formed of a material that includes at least one metal. Exemplary metals include aluminum, titanium, niobium, tantalum, magnesium and zinc. In some embodiments, substrate 110 is formed of a material that contains multiple different metals, such as an alloy (e.g., an aluminum alloy). In certain embodiments, substrate 110 is formed of an alloy that contains aluminum and at least one additional element selected from copper, manganese, silicon, magnesium, silicon and zinc. Exemplary aluminum alloys include the 1000-series, 2000-series, 3000-series, 4000-series, 5000-series, 6000-series, and 7000-series of aluminum alloys.

The surface 120 of the substrate 110 may be formed of an oxide of the metal or alloy from which substrate 110 is formed. As discussed in more detail below, in some embodiments, the oxide can be a byproduct of the anodization process used to make the article 100. The thickness of the oxide can be, for example, from 0.5 micron to 50 microns thick (e.g., from five microns to 25 microns thick). Typically, the secondary pores 140 are formed in the oxide portion of the article 100, although the disclosure is not limited in this manner.

Referring to FIG. 1, the primary pores 130 extend to have an average length that, in general, can be selected as desired. In some embodiments, this length is from one micron to 20 microns (e.g., from five microns to 15 microns).

In some embodiments, the average diameter of the primary pores 130 is at least four times (e.g., at least five times, at least 10 times, at least 25 times, at least 50 times, at least 75 times) and/or at most 100 times (e.g., at most 75 times, at most 50 times) the average diameter of the secondary pores 140. The average diameter of a group of pores is measurable by taking an SEM of the surface of an article that includes the group of pores.

In certain embodiments, the average diameter of the primary pores 130 is at least 500 nm (e.g., at least 750 nm, at least 900 nm, at least 1 µm) and/or at most 15 µm (e.g., at most 10 µm, at most 5 µm, at most 1 µm). Exemplary ranges for the average diameter of primary pores 130 include from 500 nm to 15 µm, from 750 nm to 1.25 µm, from 1 µm to 1.5 µm, and from 900 nm to 1.5 µm.

In some embodiments, the primary pores 130 have a porosity ratio (the ratio of the void volume to metal volume) of at least 0.1 (e.g., at least 0.15, at least 0.2, at least 0.25) and/or at most 0.3 (e.g., at most 0.25, at most 0.2). Exemplary ranges of the porosity ratio of the primary pores 130 include from 0.1 to 0.3, from 0.1 to 0.2, from 0.15 to 0.25, from 0.2 to 0.3, and from 0.1 to 0.25. The porosity ratio is determined by calculating the total pore volume from the amount $N_2$ adsorbed at 77 K, and determining the adsorption isotherm using a Nova Quantachrome 4200e instrument. From the data one can extrapolate the porosity ratio.

In certain embodiments, the primary pores 130 have an average aspect ratio of from 0.2 to 10 (e.g., from 0.5 to 10, from one to five).

In some embodiments, the secondary pores 140 have an average diameter of the secondary pores at most 250 nm (e.g., at most 200 nm, at most 150 nm, 100 nm) and/or at least 75 nm (e.g., at least 90 nm, at least 100 nm). Exemplary ranges for the average diameter of the secondary pores 140 include from 50 nm to 250 nm, from 50 nm to 100 nm, 75 nm to 125 nm, 100 nm to 250 nm, and 90 nm to 250 nm.

In some embodiments, the secondary pores 140 have a porosity ratio of from 0.5 to five (e.g. from 0.5 to four, from one to three).

In certain embodiments, the secondary pores 140 have an average aspect ratio of at least 10 (e.g., at least 15, at least 20, at least 25) and/or at most 40 (e.g., at most 35). Exemplary ranges for the average aspect ratio of secondary pores 140 include 10 to 40, 15 to 35, 20 to 40, 25 to 40, and 25 to 35.

The light absorbing agent 150 can be, for example, a visible light absorbing agent (an agent that absorbs light in the wavelength range of from 400 nm to 700 nm). In certain embodiments, the light absorbing agent 150 is an ultraviolet light absorbing agent (an agent that absorbs light in the wavelength range of from 10 nm to 400 nm).

In some embodiments, the light absorbing agent 150 is a dye, such as a water-soluble dye. Examples of such dyes include black diazo dyes. Exemplary black diazo dyes include: tetrasodium 6-amino-4-hydroxy-3-[[7-sulfonato-4-[(4-sulfonatophenyl)azo]-1-naphthyl]azo]naphthalene-2,7-disulfonate; tetrasodium (6Z)-4-acetamido-5-oxo-6-[[7-sulfonato-4-(4-sulfonatophenyl)azo-1-naphthyl]hydrazono]naphthalene-1,7-disulfonate; nigrosine; Caswell Black HBL dye; Sudan Black B; Nigrosin; Acid Violet 5; Acid Violet 7; Acid Violet 9; Acid Violet 17; Acid Violet 19; and process black. Exemplary dyes that are light absorbing agents also include metal-free azo dyes, sulphonated coumarin dyes, metallized azo dyes, azo/anthraquinone dyes, metal free dyes, triphenylmethane dyes, and functionalized anthraquinone dyes.

In certain embodiments, the light absorbing agent 150 can enhance the absorptivity of a specific color, resulting in reflection of a narrower color band having reduced presence of other wavelengths of light. For example, if an optical device is configured to output green light, but a light source produces both red and green light, a green dye may be used as light absorbing agent 150. With such an arrangement, a substantial component of the green light is reflected while a substantial component of the red light is not reflected.

In certain embodiments, the light absorbing agent 150 includes carbon black. In some embodiments, the carbon black is in the form of hydrophilic carbon black. The hydrophilic carbon black can be in the form of a dispersion, for example, in an amount in the range of 0.1 to 1 percent by weight (e.g., 0.4 percent by weight) of a dispersion composition. Aqueous hydrophilic carbon black dispersions are commercially available with the carbon particles thereof coated with a hydrophilic substance, e.g., as acrylic-coated carbon black particles, and the like. Examples of aqueous hydrophilic carbon black dispersions that are available in the market include Aqua-Black 162 (hydrophilic carbon black, manufactured by Tokai Carbon Co., Ltd., mean secondary particle diameter: 110 nm, carbon black concentration: 20% by weight) and Aqua-Black 001. Optionally, carbon black particles may be oxidized by liquid phase oxidation or gas phase oxidation to impart hydrophilicity by providing hydrophilic functional groups, such as carboxyl groups and/or hydroxyl groups on the surface of the carbon particles. In some embodiments, the carbon black particles are carbon black nanoparticles having an average diameter of 50 nm or less (e.g., 40 nm or less, 30 nm or less, 20 nm or less, 10 nm or less, 1 nm to 50 nm, 10 nm to 50 nm, 5 nm to 45 nm).

In some embodiments, the light absorbing agent 150 includes carbon nanotube, such as, for example, hydrophilic carbon nanotubes (e.g., as a mixture of hydrophilic carbon nanoparticles and carbon nanotubes) that have been rendered hydrophilic by, among other methods, covalent surface modification (e.g., introduction of carboxylic acid or ester groups).

Having described various aspect of the article 100, methods of making such article are now provided.

Figure 2:
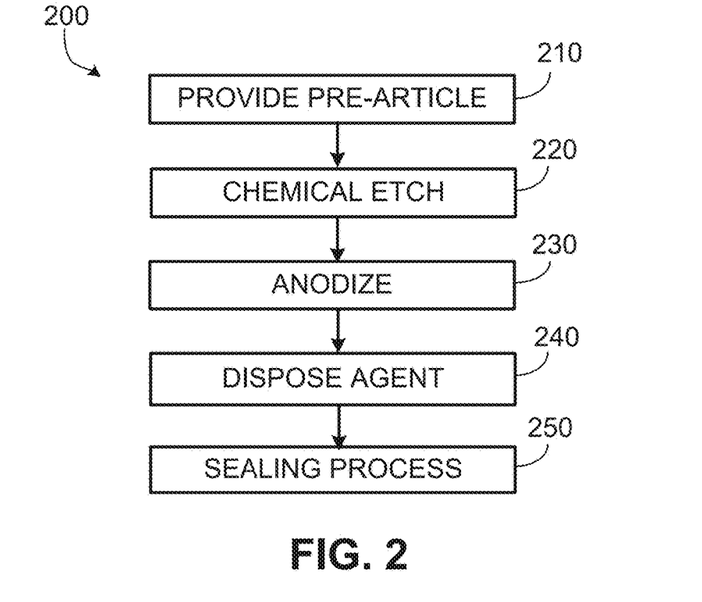
FIG. 2 is a flow chart of steps in an embodiment of a method of making article shown in FIG. 1.

FIG. 2 is a flow chart of certain step in a method 200 that can be used to make the article 100. FIGS. 3A-3D depict the result of steps in the method 200.

Figure 3A:
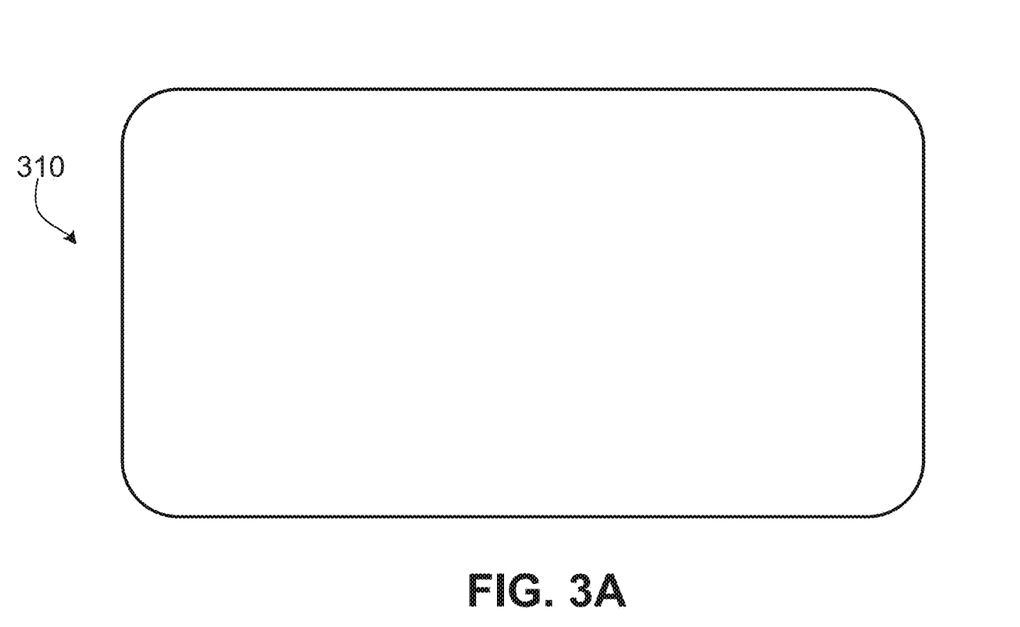
FIGS. 3A-3D are cross-sectional views of articles made during steps in the process shown in FIG. 2.

In step 210, a pre-article 310 is provided (FIG. 3A). Pre-article 310 is formed of a metal or alloy (see discussion above).

Figure 3B:
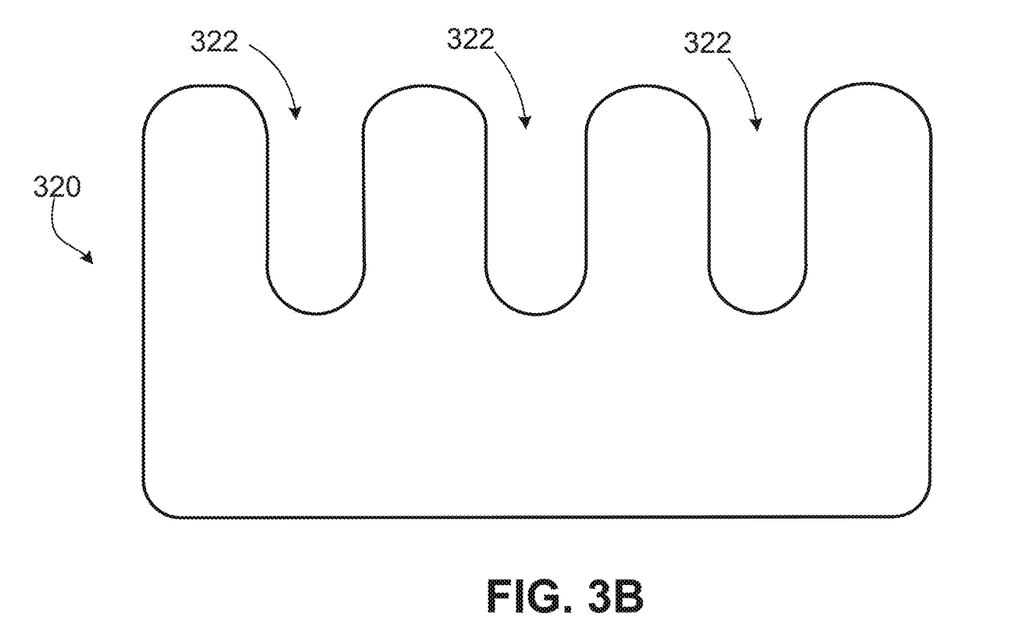

In step 220, a surface 320 of the pre-article 310 is chemically etched to yield an article 320 having primary pores 322 (FIG. 3B).

Figure 3C:
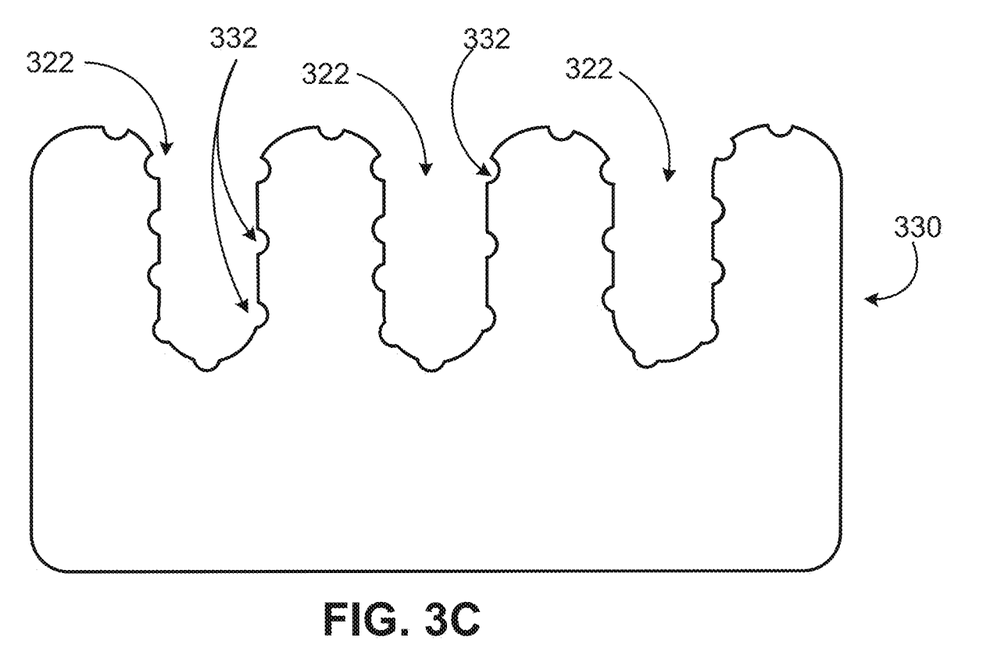

In step 230, the article 320 is anodized to yield an article 330 having primary pores 322 and secondary pores 332 with at least some of the secondary pores 332 located within primary pores 322 (FIG. 3C).

Figure 3D:
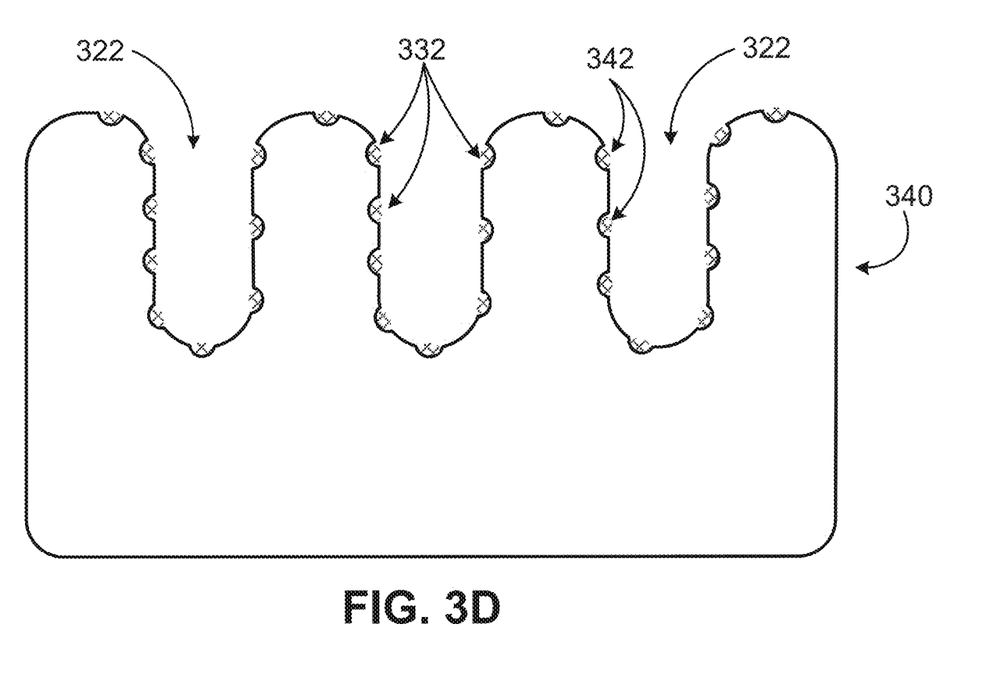

In step 240, a light absorbing agent 342 is disposed within at least some of the secondary pores 332 to yield an article 340 (FIG. 3D).

In step 250, article 340 is exposed to a sealing process. To the naked eye, the sealing process performed in step 250 may not substantially change the appearance of the surface of the article 340. However, the sealing process performed in step 250 substantially reduces the ability of the light absorbing agent 342 to diffuse out of the secondary pores 332 when, for example, the article 340 is immersed in a solvent.

Having generally described a method 200, certain details of the process of the process are now provided.

Generally, step 220 can be performed by any suitable method and under any conditions suitable for generating a plurality of primary pores on at least a portion of the pre-article. In some embodiments, step 220 includes using a corrosive solution that is sufficiently acidic or sufficiently alkaline to generate the desired primary pores. Examples of corrosive solutions include acidic solutions including from 1 wt. % to 75 wt. % inorganic acids (e.g., sulfuric acid, hydrochloric acid, phosphoric acid, chromic acid, nitric acid, perchloric acid, hydrobromic acid, hydroiodic acid, boric acid, hydrofluoric acid, the like, and suitable combinations thereof), acidic solutions including organic acids (e.g., trifluoroacetic acid, p-toluenesulfonic acid, aminomethylphosphonic acid, trifluoromethansulfonic acid, oxalic acid, and the like), alkaline solutions including 5 wt. % to 30 wt. % inorganic hydroxides (e.g., sodium hydroxide, ammonium hydroxide, potassium hydroxide, cesium hydroxide, lithium hydroxide, rubidium hydroxide) metal hydroxide solutions prepared with a pH of >12, solutions including 5 wt. % to 40 wt. % oxidizing halide salts (e.g., ferric chloride and other strong oxidants, such as cerium oxide), and solutions including a combination of an inorganic acid (e.g., 1 wt. % to 75 wt. %) and reactive peroxides or superoxides (e.g., 1 wt. % to 30 wt. % hydrogen peroxide, metal peroxides such as sodium peroxide, barium peroxide, sodium superoxide, potassium superoxide, and the like).

In general, step 220 may be performed at any suitable temperature and for any suitable amount to generate the primary pores. In some embodiments, step 210 is performed at 25° C. In certain embodiments step 220 is performed at a temperature above 25° C. (e.g., 35° C. to 90° C., 35° C. to 65° C., 40° C. to 60° C., 50° C. to 75° C.). In certain embodiments, step 210 is performed for at least 15 seconds (e.g., 15 seconds to 5 minutes).

In some embodiments, the material (e.g., metal, metal alloy) from which the pre-article is formed may affect the rate of formation of primary pores during step 220. As an example, in some embodiments, primary pores may form relatively quickly in alloys having relatively high magnesium and zinc content, possibly due to greater reactivity and/or lower redox potentials of such alloying metals. As another example, in certain embodiments, primary pores may form relatively slowly in alloys having relatively high silicon and manganese content, which can potentially result in a less anisotropic etch.

In some embodiments, between steps 220 and 230, the article is washed with a suitable solvent (e.g., deionized water) and briefly immersed in a solution that can remove, among other things, surface oxide. An example of such a solution is an alkaline solution (e.g., 3 wt. % sodium hydroxide).

In general, step 230 may be accomplished by any suitable method and under any conditions suitable for generating the secondary pores. In some embodiments, step 230 performed at a temperature of at least 10° C. (e.g., at least 20° C., at least 30° C., at least 35° C.) and/or at most to 50° C. e.g., at most 40° C. Exemplary temperature ranges include from 15° C. to 40° C., from 15° C. to 30° C., and from 10° C. to 35° C. In certain embodiments, step 230 is performed for at least 1 minute (e.g., from 1 minute to 500 minutes, from 10 minutes to 250 minutes, 20 minutes to 150 minutes, 30 minutes to 150 minutes, 50 minutes to 200 minutes).

Generally, step 230 is performed in a suitable anodizing bath. In some embodiments, the anodizing bath includes from 1 wt. % to 90 wt. % (e.g., 5 wt. % to 85 wt. %) of a strong inorganic acid (see examples above). In some embodiments, the anodizing bath includes sulfuric acid or phosphoric acid.

Step 230 typically involves applying a voltage. In some embodiments, the voltage is from 5 to 30 volts (e.g., from 10 volts to 20 volts, from 10 volts to 15 volts, from 10 volts to 30 volts, from 20 volts to 30 volts, from 5 volts to 15 volts).

Optionally, between steps 230 and 240, the article may be washed with a suitable solvent (e.g., deionized water). The blackening agent and/or the coloring agent, examples of which are described herein, is/are incorporated into the chemically etched and anodized metal part to obtain an unsealed metal part having the blackening agent and/or coloring agent incorporated into at least the secondary pores.

Step 240 can be performed using any appropriate technique that desirably results in the light absorbing agent being disposed in at least some of the secondary pores. In some embodiments, step 240 includes immersing at least a portion of the article having primary and secondary pores in a solution that includes the light absorbing agent (e.g., 0.5 wt. % to 10 wt. % light absorbing agent). In certain embodiments, the solution is an aqueous solution that can include one or more water miscible solvents (e.g., ethanol, or any suitable $C_1$-$C_5$ alkanol, tetrahydrofuran, acetone, and acetonitrile).

In general, during step 240, the article can be immersed in such a solution for a period of time that results in the desired disposition of the light absorbing agent in secondary pores. In some embodiments, the article is immersed in such a solution for a least one minute (e.g., from minute to one hour, from 15 minutes to 45 minutes, from 5 minutes to 20 minutes, from 20 minutes to 50 minutes, from 20 minutes to 40 minutes).

Generally, step 240 can be performed at any appropriate temperature. In certain embodiments, step 240 is performed at a temperature of at least 10° C. (e.g., from 10° C. to 80° C., from 40° C. to 60° C., from 40° C. to 80° C.).

Optionally, between steps 240 and 250, the article may be washed with a suitable solvent (e.g., deionized water) prior to the sealing.

In general, step 250 is performed to, among other things, alter (e.g., close) the porous aluminum oxide layer present after step 240 to substantially reduce the ability of the light absorbing agent to leave the secondary pores when, for example, the article is immersed in a solvent. Without such a sealing step, an anodic coating can feel sticky and/or can be relatively highly absorbent to dirt, grease, oil, and stains. Sealing results in enhanced corrosion resistance with comparatively little impact on the wear resistance of the anodized oxide layer.

In some embodiments, step 250 is performed by disposing the article in boiling water (e.g., boiling, deionized water). Other solutions with a variety of additions of sealing salts can be used. Examples include mid-temperature sealing, and cold sealing.

Hot water sealing in step 250 generally includes immersing the article in hot (e.g., from 96° C. to 100° C.) water. Without wishing to be bound by theory, it is believed that this results in formation of a hydrated aluminum oxide (boehmite) forms in the pores. It is believed that the process first involves the precipitation of hydrated aluminum oxide as a gel of pseudoboehmite. It is further believed that this precipitation may controlled by diffusion, pH, and chemical composition of the sealing solution. Increasing pH is believed to start a condensation of the gel and crystalline pseudoboehmite will form and will substantially fill the pores. In the case of the metal parts of the various embodiments described herein, it is believed that mostly the secondary pores that will be filled in the sealing. It is also believed that the pseudoboehmite recrystallizes to form boehmite starting at the surface, and that this hydrated aluminum oxide (boehmite) has a greater volume than the aluminum oxide.

The sealing time in hot, deionized water can vary. In some embodiments, the sealing time can be less than 15 minutes. The speed at which high temperature sealing (e.g., sealing with hot, deionized water) is generally dependent on temperature and pH of the sealing solution. For example, sealing at 96° C. may involve 6% longer sealing time than sealing at 98° C. This dependency of the temperature makes mid-temperature sealing, which works at 60-80° C., can make the process more prone to leaching of colors.

In some embodiments, hot water sealing includes immersing at least a portion of the unsealed metal part in aqueous nickel acetate (e.g., 0.1 wt. % to 22.2 wt. % in water), and/or treating at least a portion of the unsealed metal part with steam.

Optionally, mid-temperature sealing can be used. Mid-temperature sealing solutions often contain metal salts and organic additives, but have a lower energy cost. Mid-temperature sealing still uses the fact that aluminum oxide is hydrated to boehmite.

Cold sealing involves a different mechanism. In this process the sealing happens by an impregnation process at 25-30° C. In some embodiments, fluoride in a sealing solution dissolves the porous, anodized layer and then deposits as a fluoro-aluminate at the top 3-6 µm of the layer. This process can be slow and can be accelerated by heating.

EXAMPLE

An aluminum article was cleaned (by washing with soap and thoroughly rinsing with water) and degreased (with an oil extracting solvent) to substantially remove oils, greases, and stains from the surface. The article was then immersed in 3 wt. % aqueous sodium hydroxide for three minutes to remove surface oxide from the article. An SEM of the surface of the article (not shown) revealed that the surface lacked primary and secondary pores.

Figure 4:
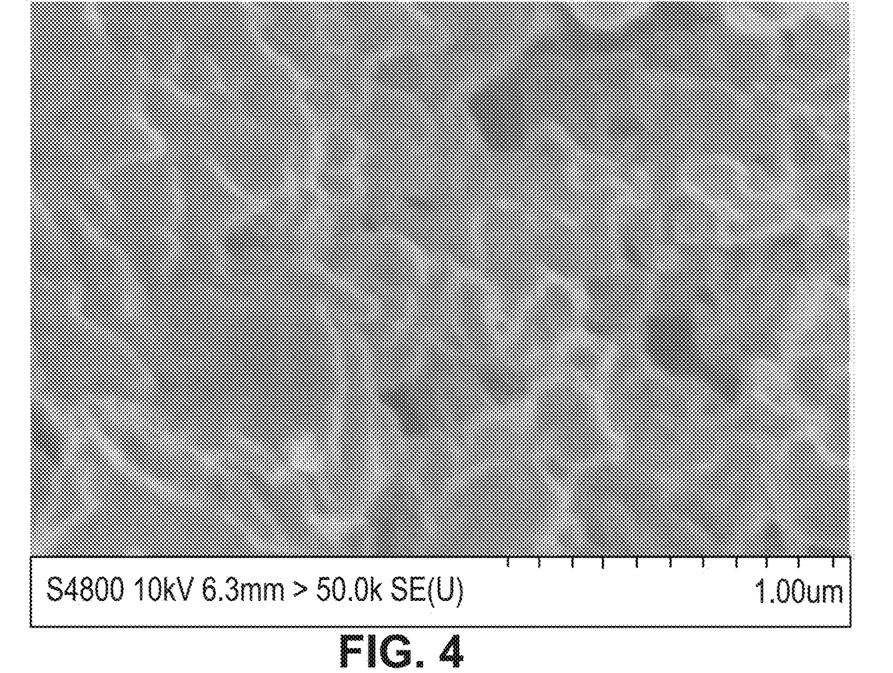
FIG. 4 is a scanning electron micrograph (SEM) of an article.

Next, the article was washed with deionized water and wet etched by immersing the article in an aqueous solution containing 1 wt. % hydrogen peroxide and 6 wt. % hydrochloric acid at 50° C. for two minutes. Following wet etching, the article was washed with deionized water, and then immersed in 3 wt. % sodium hydroxide for three minutes to remove surface oxide. An SEM of the surface of the article is shown in FIG. 4. The SEM shows the presence of primary pores at the surface of the article. The SEM also shows that the surface is rougher and has a substantially increased surface area.

Figure 5:
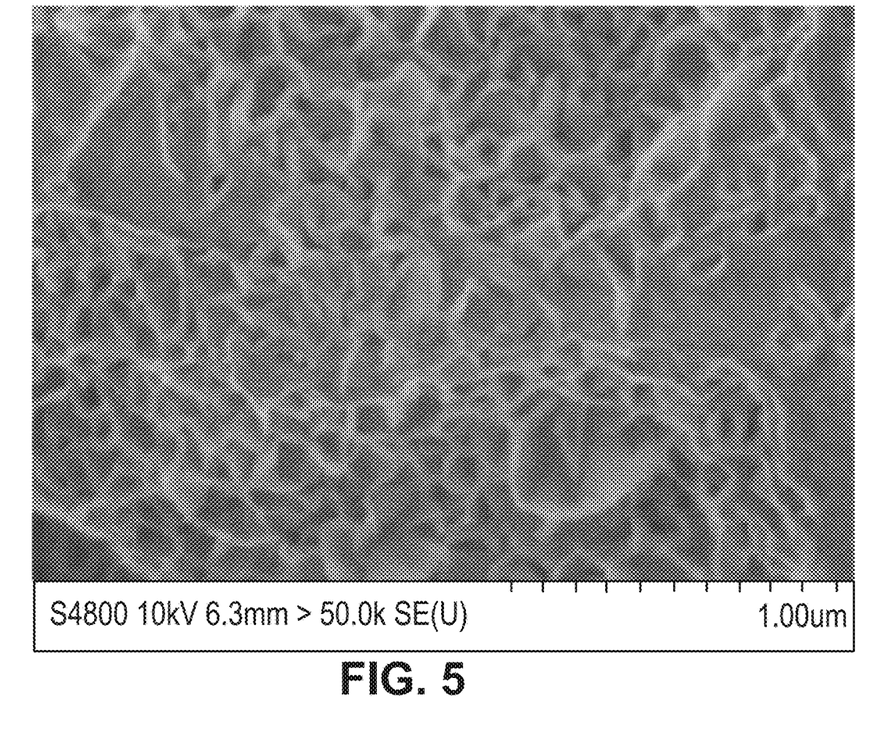
FIG. 5 is an SEM of an article.

Next, the sample was anodically polarized at 15 volts for 90 minutes in a solution of 15 wt. % aqueous sulfuric acid. Afterwards, the sample was rinsed in dilute sulfuric acid, deionized water. An SEM of the surface of the resulting article is shown in FIG. 5. The SEM shows the presence of primary pores and secondary pores at the surface of the article.

The article was subsequently dyed using Caswell black dye, and the surface was then exposed to 1.5 wt. % aqueous $Ni(OAc)_2$ at 40° C. for 15 minutes as a sealing process.

OTHER EMBODIMENTS

While certain embodiments have been provided, the disclosure is not limited to such embodiments.

As an example, in some embodiments, at least some of the secondary pores can contain more than one light absorbing agent.

As another example, while certain methods of making an article have been described, other methods of making such an article may be used.

As a further example, while certain methods of making an article have been described, such methods may be used to make different articles.

As still another example, while embodiments have been described in which a light absorbing agent is used to reduce light reflection, the disclosure is not limited in this manner. For example, in certain embodiments, one or more light absorbing agents are used to provide the article with a desired matte finish on a metal surface, e.g., for aesthetic purposes.

As an additional example, while FIG. 2 depicts aspects of an embodiment of a process, the disclosure is not limited to such aspects. A method according to the disclosure may include additional steps and/or different steps. For example, providing the pre-article may first involves cut and/or shaping as desired. The pre-article can be electrically connected by any suitable method for racking and manipulation, and subsequently cleaned and degreased to remove undesired contaminants, such as oils, greases, or stains. The pre-article may be treated to remove a surface oxide can be removed, e.g., by a brief immersion in, e.g., 3 wt. % aqueous sodium hydroxide. Subsequently, the pre-article may be washed with a suitable solvent (e.g., deionized water). In general, the steps noted in this paragraph are performed prior to step 210.

What is claimed is:

1. A system, comprising:
    an article, comprising a substrate comprising a metal, wherein:
        a surface of the substrate comprises primary pores and secondary pores;
        an average diameter of the primary pores is at least four times greater than an average diameter of the secondary pores; and
        the system comprises an optical system.
2. The system of claim 1, wherein the average diameter of the primary pores is at least five times greater than the average diameter of the secondary pores.
3. The system of claim 1, wherein the average diameter of the primary pores is at least 500 nm.
4. The system of claim 1, wherein the average diameter of the primary pores is at least 1 µm.
5. The system of claim 1, wherein the average diameter of the primary pores is at most 5 µm.
6. The system of claim 1, wherein the article has a region which comprises the primary pores, and the region of the article has a porosity ratio of at least 0.1.
7. The system of claim 1, wherein the article has a region which comprises the primary pores, and the region of the article has a porosity ratio of at most 0.3.
8. The system of claim 1, wherein the average diameter of the secondary pores is at most 250 nm.
9. The system of claim 1, wherein the average diameter of the secondary pores is at least 50 nm.
10. The system of claim 1, wherein the secondary pores have an average aspect ratio of at least 10.
11. The system of claim 1, wherein the secondary pores have an average aspect ratio of at most 40.
12. The system of claim 1, further comprising a light absorbing agent.
13. The system of claim 12, wherein at least some of the secondary pores comprise the light absorbing agent.
14. The system claim 13, wherein the light absorbing agent comprises a visible light absorbing agent.
15. The system claim 13, wherein the light absorbing agent comprises a dye.
16. The system claim 15, wherein the dye comprises a water-soluble dye.
17. The system of claim 1, wherein the surface of the article has a fractional reflectance of at most 0.0002 at a wavelength of from 400 nm to 700 nm.
18. The system of claim 1, wherein:
    the surface of the article has a first fractional reflectance at a first wavelength of from 400 nm to 700 nm;
    the surface of the article has a second fractional reflectance at a second wavelength of from 400 nm to 700 nm;
    the first wavelength is different from the second wavelength; and
    the first fractional reflectance is different from the second fractional reflectance.
19. The system of claim 1, wherein the surface of the article has a fractional reflectance of at most 0.0002 at a wavelength of from 10 nm to 400 nm.
20. The system of claim 1, wherein the metal comprises a member selected from the group consisting of aluminum, titanium, niobium, tantalum, magnesium and zinc.
21. The system of claim 1, wherein a portion of the substrate comprises an oxide, and the oxide comprises the metal.

22. The system of claim 21, wherein the secondary pores are present in the portion of the oxide.

23. The system of claim 1, wherein the surface of the article comprises a fluoro-aluminate.

24. The system of claim 1, wherein the surface of the article comprises a hydrated aluminum oxide.

25. The system of claim 1, wherein the system comprises a member selected from the group consisting of a holographic projection apparatus, a camera, a telescope, a color selective filter, a housing for a photonic sensor, a solar collector, a thermal solar system, an information display system, and a system for storing light sensitive materials.

26. A system, comprising:
an article, comprising a substrate comprising a metal, wherein:
   a surface of the substrate comprises primary pores and secondary pores;
   an average diameter of the primary pores is from 500 nm to 15 μm; and
   an average diameter of the secondary pores 50 nm to about 250 nm.

27. The system of claim 26, wherein an average diameter of the primary pores is at least four times greater than an average diameter of the secondary pores.

28. The system of claim 26, wherein the system comprises a member selected from the group consisting of a holographic projection apparatus, a camera, a telescope, a color selective filter, a housing for a photonic sensor, a solar collector, a thermal solar system, an information display system, and a system for storing light sensitive materials.

29. The system of claim 26, wherein the system comprises an optical system.

* * * * *

UNITED STATES PATENT AND TRADEMARK OFFICE
CERTIFICATE OF CORRECTION

PATENT NO. : 10,551,528 B2  
APPLICATION NO. : 16/025129  
DATED : February 4, 2020  
INVENTOR(S) : Joshua D. Wiensch, Tina Qin and Jonathan Seamus Blackley Page 1 of 1

It is certified that error appears in the above-identified patent and that said Letters Patent is hereby corrected as shown below:

In the Claims

Column 12, Line 40, Claim 14, after "system" insert -- of --;

Column 12, Line 42, Claim 15, after "system" insert -- of --;

Column 12, Line 44, Claim 16, after "system" insert -- of --.

Signed and Sealed this  
Fifth Day of May, 2020

Andrei Iancu  
*Director of the United States Patent and Trademark Office*